(12) United States Patent
Byun

(10) Patent No.: US 11,269,767 B2
(45) Date of Patent: Mar. 8, 2022

(54) MEMORY CONTROLLER AND OPERATING METHOD THEREOF

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 59 days.

(21) Appl. No.: 16/692,615

(22) Filed: Nov. 22, 2019

(65) Prior Publication Data

US 2021/0011844 A1 Jan. 14, 2021

(30) Foreign Application Priority Data

Jul. 8, 2019 (KR) .................... 10-2019-0082154

(51) Int. Cl.
*G06F 12/02* (2006.01)
*G06F 3/06* (2006.01)

(52) U.S. Cl.
CPC .......... *G06F 12/0253* (2013.01); *G06F 3/061* (2013.01); *G06F 3/0652* (2013.01); *G06F 3/0659* (2013.01); *G06F 3/0679* (2013.01); *G06F 2212/1044* (2013.01)

(58) Field of Classification Search
None
See application file for complete search history.

(56) References Cited

U.S. PATENT DOCUMENTS

| 2016/0364142 A1* | 12/2016 | Kanno | G06F 3/064 |
| 2017/0060738 A1* | 3/2017 | Shaharabany | G06F 12/0246 |
| 2017/0160960 A1* | 6/2017 | Camp | G06F 3/0616 |

FOREIGN PATENT DOCUMENTS

| KR | 10-2014-0094278 | 7/2014 |
| KR | 10-2016-0110596 | 9/2016 |

* cited by examiner

*Primary Examiner* — Michael Alsip
(74) *Attorney, Agent, or Firm* — IP & T Group LLP

(57) ABSTRACT

A memory controller for performing garbage collection without moving data of a valid page, controls a memory device including a plurality of memory blocks in which data is stored. The memory controller includes a victim block setting circuit for selecting a victim block among the memory blocks by receiving memory block information representing whether a valid page and an invalid page are included in each of the plurality of memory blocks, when garbage collection is performed, and a sub-block controller for outputting a sub-block read command for determining valid pages included in each of sub-blocks within the victim block, by dividing the victim block into the sub-blocks, and outputting a sub-block erase command for selectively erasing a part of the sub-blocks included in the victim block, by receiving sub-block information corresponding to the sub-block read command from the memory device.

18 Claims, 11 Drawing Sheets

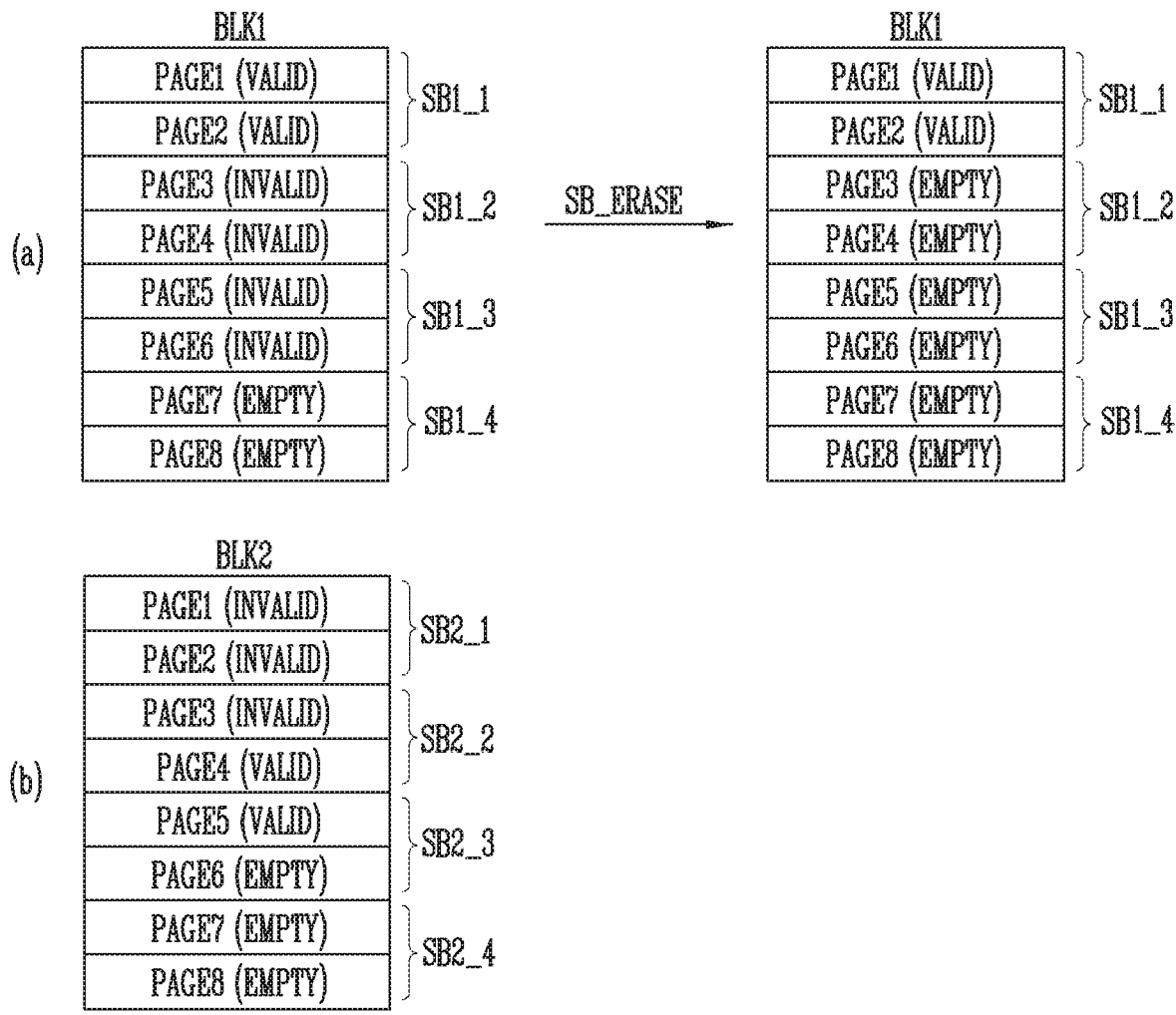

| BLK1 | |
|---|---|
| PAGE1 (VALID) | } SB1_1 |
| PAGE2 (VALID) | |
| PAGE3 (VALID) | } SB1_2 |
| PAGE4 (VALID) | |
| PAGE5 (EMPTY) | } SB1_3 |
| PAGE6 (EMPTY) | |
| PAGE7 (EMPTY) | } SB1_4 |
| PAGE8 (EMPTY) | |

MEMORY CONTROLLER AND OPERATING METHOD THEREOF

CROSS-REFERENCE TO RELATED APPLICATION

The present application claims priority under 35 U.S.C. § 119(a) to Korean patent application number 10-2019-0082154 filed on Jul. 8, 2019, which is incorporated herein by reference in its entirety.

BACKGROUND

1. Field of Invention

The present disclosure generally relates to an electronic device, and more particularly, to a memory controller and an operating method thereof.

2. Description of Related Art

A storage device is a device for storing data under the control of a host device such as a computer, a smart phone or a smart pad. The storage device may include a device configured to store data on a magnetic disk, such as a Hard Disk Drive (HDD), and/or a device configured to store data on a semiconductor memory, i.e., a nonvolatile memory, such as a Solid-State Drive (SSD) or a memory card. A device configured to store data on a semiconductor memory is typically referred to as a memory device.

A storage device including a memory device configured to store data and a memory controller configured to control the memory device is also referred to as a memory system. Memory devices may be classified into volatile and nonvolatile memory devices. Examples of nonvolatile memory devices include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

Demand for improved electronic devices requires continuous improvements in the structure and functionality of memory systems.

SUMMARY

Embodiments of the present invention provide an improved memory controller for a memory system which is capable of performing garbage collection without moving data of a valid page. Embodiments of the present invention also provide an operating method of the memory controller.

In accordance with an aspect of the present disclosure, there is provided a memory controller for controlling a memory device including a plurality of memory blocks in which data is stored, the memory controller including: a victim block setting circuit configured to select a victim block among the memory blocks by receiving memory block information representing whether a valid page and an invalid page are included in each of the plurality of memory blocks, when garbage collection is performed and a sub-block controller configured to, output a sub-block read command for determining valid pages included in each of sub-blocks within the victim block, by dividing the victim block into the sub-blocks, and output a sub-block erase command for selectively erasing a part of the sub-blocks included in the victim block, by receiving sub-block information corresponding to the sub-block read command from the memory device.

In accordance with another aspect of the present disclosure, there is provided a method for operating a memory controller for controlling a memory device including a plurality of memory blocks in which data is stored, the method including: receiving memory block information representing whether a valid page and an invalid page are included in each of the plurality of memory blocks, when garbage collection is performed, selecting a victim block among the memory blocks, based on the memory block information, determining a sub-block to be erased among sub-blocks within the victim block by dividing the victim block into the sub-blocks and outputting a sub-block erase command for erasing the determined sub-block.

In accordance with another aspect of the present disclosure, there is provided a memory system comprising, a memory device including a victim memory block having plural sub-blocks each having plural pages, and a controller configured to control, during a garbage collection operation on the victim memory block, the memory device to erase a sub-block having only invalid pages within the victim memory block and set the victim memory block as an open memory block without moving valid data from the victim memory block to any memory block.

BRIEF DESCRIPTION OF THE DRAWINGS

Example embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. Like reference numerals refer to like elements throughout.

FIG. 6 is a diagram illustrating a garbage collection operation in accordance with an embodiment of the present disclosure.

FIG. 7 illustrates a bitmap in an erase operation on a sub-block in a victim block.

DETAILED DESCRIPTION

Figure 1:
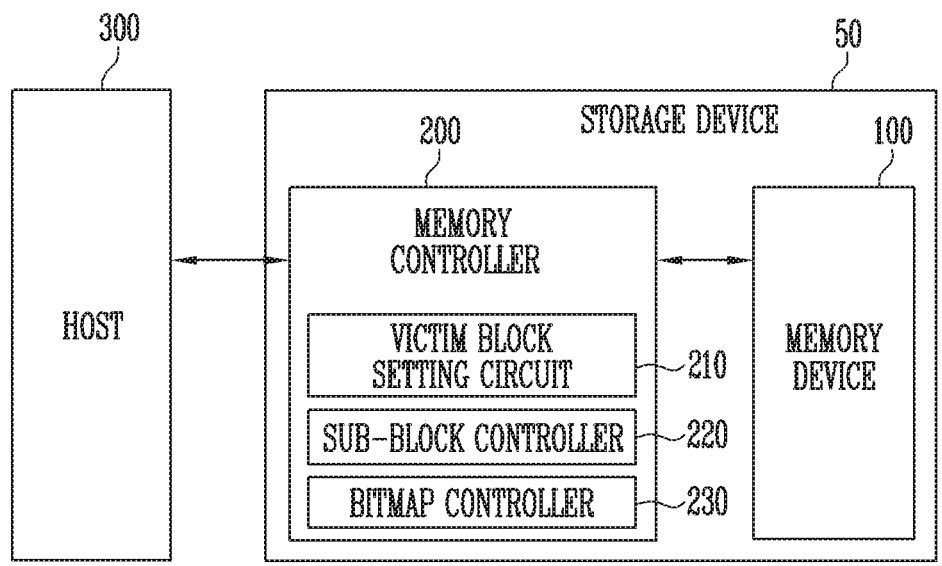
FIG. 1 is a block diagram illustrating a storage device.

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

The embodiments according to the concept of the present disclosure can be variously modified and have various shapes. The embodiments are illustrated in the drawings and are intended to be described herein in detail. However, the embodiments according to the concept of the present disclosure are not construed as limited to specified disclosures, and include all changes, equivalents, or substitutes that do not depart from the spirit and technical scope of the present disclosure.

While terms such as "first" and "second" may be used to describe various components, such components must not be understood as being limited to the above terms. The above terms are used only to distinguish one component from another. For example, a first component may be referred to as a second component without departing from the scope of the present disclosure, and likewise a second component may be referred to as a first component.

As used herein, the recitation of "at least one of A, B and C" may mean any one of "A," "B," "C," "A and B," "B and C," "A and C," and "A, B, and C." In addition, the recitation of "at least one of A, B and C" may be identical to the recitation of "at least one of A, B or C", or have a meaning including any one of components included in A, any one of components included in B, and any one of components included in C.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present. Meanwhile, other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood such that they terms have meanings consistent with the context of the related technique. So far as not being clearly defined in this application, terms should not be understood in an ideally or excessively formal way.

It should be understood that the drawings are simplified schematic illustrations of the described devices and may not include well known details for avoiding obscuring the features of the invention.

It should also be noted that features present in one embodiment may be used with one or more features of another embodiment without departing from the scope of the invention.

No term used in the claims herein is intended to invoke interpretation under 35 U.S.C. § 112(f), unless "means for" or "step for" is used in connection with a particular term. As used in the present specification and claims, the terms 'circuit', 'component', 'module' and the like refer to hardware or a combination of hardware and software/firmware. As a further example, as used in this application, any of the above terms may also cover an implementation of merely a processor (or multiple processors) or portion of a processor and its (or their) accompanying software and/or firmware.

In describing those embodiments, description will be omitted for techniques that are well known to the art to which the present disclosure pertains, and are not directly related to the present disclosure. This intends to disclose the gist of the present disclosure more clearly by omitting unnecessary description.

Hereinafter, various embodiments of the present disclosure will be described in detail with reference to the accompanying drawings in order for those skilled in the art to be able to readily implement the technical spirit of the present disclosure.

FIG. 1 is a block diagram illustrating a storage device 50.

Referring to FIG. 1, the storage device 50 may include a memory device 100 and a memory controller 200 operatively coupled to each other.

The storage device 50 may store data under the control of a host 300. The host 300 may be, for example at least one of a mobile phone, a smart phone, an MP3 player, a laptop computer, a desktop computer, a game console, a TV, a tablet PC and an in-vehicle infotainment.

The storage device 50 may be manufactured as any one of various types of storage devices according to a host interface that is a communication scheme with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD)

card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. For example, the storage device 50 may be manufactured as one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 may operate under the control of the memory controller 200. The memory device 100 may include a memory cell array including a plurality of memory cells for storing data. The memory cell array may include a plurality of memory blocks. Each memory block may include a plurality of memory cells, and the plurality of memory cells may constitute a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

In an embodiment, the memory device 100 may be implemented in a two-dimensional array structure or a three-dimensional array structure. Hereinafter, a case where the memory device 100 is implemented in the three-dimensional array structure is described as an embodiment, however, the present disclosure is not limited to the three-dimensional array structure. The present disclosure may be applied to not only a flash memory device in which a charge storage layer is configured with a Floating Gate (FG) but also to a Charge Trap Flash (CTF) in which a charge storage layer is configured with an insulating layer.

In an embodiment, the memory device 100 may be operated using a Single Level Cell (SLC) scheme in which one data bit is stored in one memory cell. Alternatively, the memory device 100 may be operated using a scheme in which at least two data bits are stored in one memory cell. For example, the memory device 100 may be operated using a Multi-Level Cell (MLC) scheme in which two or more data bits are stored in one memory cell. A scheme in which three data bits are stored in one memory cell may be referred to as a Triple Level Cell (TLC) scheme, and a scheme in which four data bits are stored in one memory cell may be referred to as a Quadruple Level Cell (QLC) scheme.

The memory device 100 may be configured to receive a command and an address from the memory controller 200 and may access an area selected by the address in the memory cell array. That is, the memory device 100 may perform an operation corresponding to the command on the area of the memory cell array selected by the address. For example, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

The memory controller 200 may include a victim block setting circuit 210. In an embodiment, when the memory controller 200 performs Garbage Collection (GC) operation, the victim block setting circuit 210 may select a memory block as a victim block on which the GC is to be performed among the plurality of memory blocks included in the memory device 100. The victim block may be a memory block including an invalid page in which invalid data is stored and a valid page in which valid data is stored, among the plurality of memory blocks.

The GC operation may be performed at an idle time at which the memory device 100 does not perform any operation. That is, the GC operation may be performed at a time at which the memory device 100 does not execute any command. Alternatively, the GC operation may be performed when the memory device 100 is in a ready state. In another embodiment, the GC operation may be performed in response to a request from the memory controller 200 or the host 300, regardless of an operation time of the memory device 100.

The GC operation may be performed to secure a free block in which data can be stored.

In a GC operation, valid data in a victim block may be moved to a free block, and then the victim block may be erased to become a free block. An erase operation performed herein may be a block erase operation of erasing the entire victim block. Through the block erase operation, the victim block may become a free block, and new data may be programmed in the free block.

However, in the present disclosure, a sub-block erase operation instead of the block erase operation may be performed on a victim block without moving valid data from the victim block to a free block during a GC operation. The sub-block erase operation may be an erase operation of erasing pages included in the victim block by units of sub-blocks.

For example, pages included in a memory block may be divided in a plurality of sub-blocks. A sub-block may include two or more pages. Sub-blocks included in a memory block may include the same number or different number of pages. One or more sub-blocks may be selected in the sub-block erase operation, and the selected sub-blocks may be simultaneously or sequentially erased. The selected sub-blocks may include only the invalid pages of the memory block.

The victim block setting circuit 210 may select a memory block as a victim block to be erased in a sub-block unit scheme. The victim block setting circuit 210 may select a memory block as a victim block to be erased in the sub-block unit scheme, and generate victim block information on the set victim block.

The memory controller 200 may include a sub-block controller 220. The sub-block controller 220 may erase a sub-block included in the victim block according to the victim block information, and control the victim block to be set as an open block. An open block is a block which has valid pages and free pages.

For example, the sub-block controller 220 may read pages included in one victim block in the sub-block unit, and erase only sub-blocks that do not include valid pages, based on the read result. All invalid pages in the one victim block may be allocated in one or more sub-blocks. When the sub-blocks including only invalid pages are erased, only the valid pages and the erased pages may remain in the one victim block.

The sub-block controller 220 may generate sub-block information on erased sub-blocks in a victim block.

The sub-block controller 220 may generate sub-block erase information on sub-blocks to be erased in a victim block. The sub-block erase information includes information on sub-blocks on which an erase operation is to be performed among sub-blocks included in the victim block.

After completion of the erase operation on the sub-block having only invalid pages without moving valid data from the victim block to another memory block during the GC operation, the sub-block controller 220 may set a victim block as an open block, and data may be programmed to the victim block set as the open block. Bitmap information may be output to the memory device 100 to program data to the victim block set as the open block. The memory device 100 may program data to any one page among pages included in a sub-block erased based on the bitmap information.

The memory controller 200 may include a bitmap controller 230. The bitmap controller 230 may include a bit map for each memory block included in the memory device 100. A bit value initially included in the bitmap may be a default value.

The bitmap controller 230 may change the bit value included in the bit map, based on sub-block erase information received from the sub-block controller 220. The bitmap controller 230 may control a bit value corresponding to a sub-block to be erased among bit values included in a bitmap of the victim block. A bit value included in a bitmap may be changed based on the sub-block erase operation. For example, a bit value corresponding to the sub-block to be erased in the victim block may be changed from "0" (i.e., a default value) to "1." In another embodiment, a bit value corresponding to the sub-block to be erased in the victim block may be changed from "1" (i.e., a default value) to "0."

Subsequently, when the victim block is set as an open block, and a program operation is performed on pages included in a corresponding memory block, the bitmap controller 230 may output bitmap information on the corresponding memory block to the memory device 100.

The memory controller 200 may control the overall operations of the storage device 50.

When a power voltage is applied to the storage device 50, the memory controller 200 may execute firmware (FW). When the memory device 100 is a flash memory device, the memory controller 200 may execute FW such as an FTL for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory, a logical-physical address mapping table that establishes a mapping relationship between the LBA and the PBA.

The memory controller 200 may control the memory device 100 to perform a program operation, a read operation, an erase operation, or the like in response to a request from the host 300. For example, when a program request is received from the host 300, the memory controller 200 may change the program request into a program command, and provide the memory device 100 with the program command, a PBA, and data. When a read request is received together with an LBA from the host 300, the memory controller 200 may change the read request into a read command, select a PBA corresponding to the LBA, and then provide the memory device 100 with the read command and the PBA. When an erase request is received together with an LBA from the host 300, the memory controller 200 may change the erase request into an erase command, select a PBA corresponding to the LBA, and then provide the memory device 100 with the erase command and the PBA.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear levelling and a program operation for garbage collection.

In an embodiment, the storage device 50 may further include a buffer memory (not shown). The memory controller 200 may control data exchange between the host 300 and the buffer memory. Alternatively, the memory controller 200 may temporarily store system data for controlling the memory device 100 in the buffer memory. For example, the memory controller 200 may temporarily store data input from the host 300 in the buffer memory, and then transmit the data temporarily stored in the buffer memory to the memory device 100.

In various embodiments, the buffer memory may be used as a working memory or cache memory of the memory controller 200. The buffer memory may store codes or commands executed by the memory controller 200. Alternatively, the buffer memory may store data processed by the memory controller 200.

In an embodiment, the buffer memory may be implemented with a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), or a Static Random Access Memory (SRAM).

In various embodiments, the buffer memory may be coupled to the storage device 50 at the outside of the storage device 50. Therefore, volatile memory devices 100 coupled to the storage device 50 at the outside of the storage device 50 may perform functions of the buffer memory.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
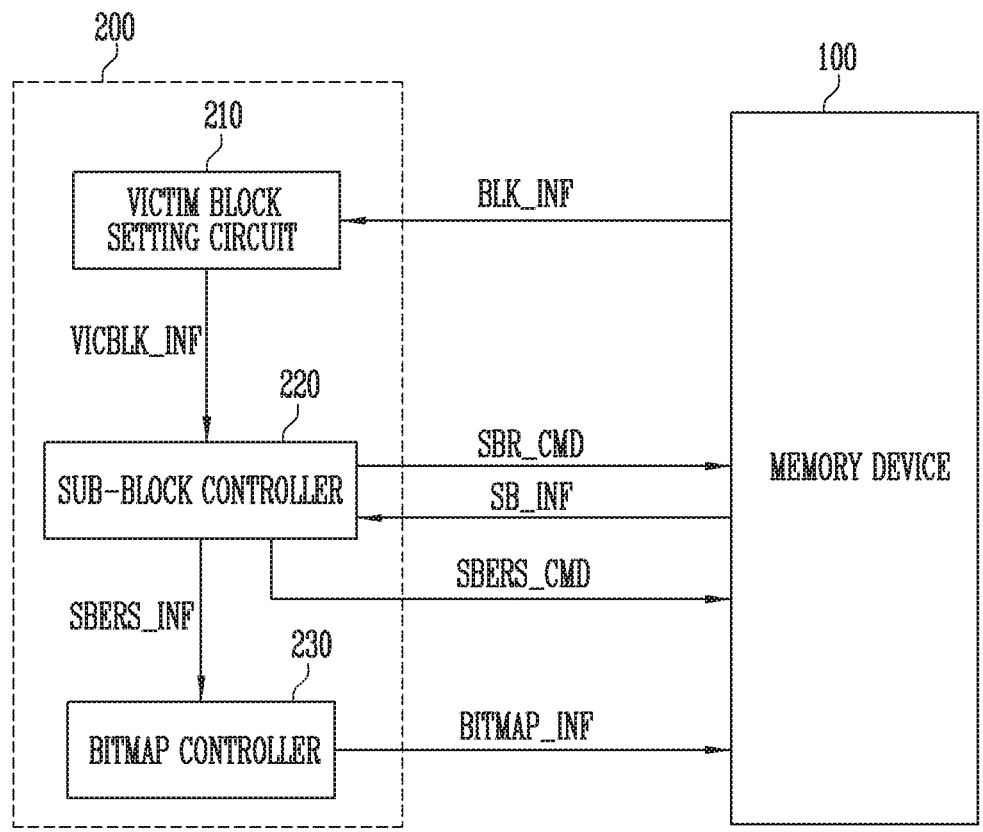
FIG. 2 is a diagram illustrating a structure of a memory controller shown in FIG. 1 and a garbage collection operation in accordance with an embodiment of the present disclosure.

FIG. 2 is a diagram illustrating a structure of the memory controller shown in FIG. 1 and a garbage collection operation according to an embodiment of the present disclosure.

Referring to FIG. 2, the memory controller 200 may include a victim block setting circuit 210, a sub-block controller 220, and a bitmap controller 220.

In an embodiment, when the memory controller 200 performs Garbage Collection (GC), the victim block setting circuit 210 may receive memory block information BLK_INF from the memory device 100. The memory block information BLK_INF may include information on pages respectively included in the memory blocks included in the memory device 100.

In an embodiment, the memory block information BLK_INF may include information on numbers of valid pages and invalid pages, which are included in each memory block. That is, the memory block information BLK_INF may represent whether both valid pages in which valid data is stored and invalid pages in which invalid data is stored are included in each memory block. For example, the memory block information BLK_INF may indicate that two valid pages and four invalid pages are included in a first memory block and two valid pages and three invalid pages are included in a second memory block.

The victim block setting circuit 210 may determine a victim block, based on the memory block information BLK_INF. In an embodiment, the victim block setting circuit 210 may select, as a victim block, a memory block including both valid and invalid pages. The number of victim blocks set by the victim block setting circuit 210 may vary.

When the victim block setting circuit 210 selects a victim block, the victim block setting circuit 210 may generate victim block information VICBLK_INF as information on the victim block. The victim block setting circuit 210 may output the generated victim block information VICBLK_INF to the sub-block controller 220. An address of the victim block may be included in the victim block information VICBLK_INF.

In an embodiment, the sub-block controller 220 may divide a memory block set as the victim block in one or more sub-blocks according to the victim block information VICBLK_INF, and perform a read operation on at least one sub-block. The sub-blocks may be configured with a plurality of pages. That is, the sub-blocks may include at least two pages. The number of pages included in the sub-blocks may vary.

The sub-block controller 220 may output a sub-block read command SBR_CMD to the memory device 100. The sub-block read command SBR_CMD may correspond to an operation of reading pages included in a sub-block in a victim block. The memory device 100 may perform a read operation on a sub-block in the victim block, and output sub-block information SB_INF including information on whether pages included in the read sub-block have only valid or invalid pages. The sub-block controller 220 may determine a sub-block on which the erase operation is to be performed in the victim block, based on the sub-block information SB_INF. For example, if the read sub-block has only invalid pages the read sub-block can then be erased. If the sub-block includes only valid pages then the sub-block will not be erased.

In an embodiment, when the sub-block controller 220 determines a sub-block to be erased for a victim block, the sub-block controller 220 may output a sub-block erase command SBERS_CMD for erasing the corresponding sub-block. That is, the sub-block controller 220 may output a sub-block erase command SBERS_CMD to erase sub-blocks except sub-blocks including only valid pages. Namely, the sub-block controller 220 may control to erase sub-blocks including only invalid pages. The memory device 100 may perform an erase operation on a sub-block in a victim block in response to the sub-block erase command SBERS_CMD.

In the present disclosure, valid data stored in a valid page in a victim block are not be moved to a free block. That is, since a victim block is divided into sub-blocks, and sub-blocks except sub-blocks including valid pages are erased, the GC may be performed without moving any valid data. Thus, in a GC operation, an operation of copying valid data to a free block can be omitted, and accordingly, the efficiency of GC can be improved.

In an embodiment, when the sub-block controller 220 determines a sub-block to be erased for each victim block, the sub-block controller 220 may output, to the bitmap controller 230, sub-block erase information SBERS_INF including information on the determined sub-block for each victim block.

In an embodiment, the bitmap controller 230 may change a bit value included in a bitmap, based on the sub-block erase information SBERS_INF. The bitmap controller 230 may include a bitmap for each memory block. The bitmap controller 230 may change a bit value corresponding to a sub-block to be erased among bit values included in the bitmap.

For example, when an initial bitmap is generated, a bit value corresponding to each of the sub-blocks included in a memory block may be "0" as a default value. In another embodiment, a default value corresponding to each of the sub-blocks included in a victim block may be "1."

Subsequently, in the present disclosure, when the GC operation is performed, the bitmap controller 230 may change a bit value corresponding to a sub-block to be erased in a victim block included in the sub-block erase information SBERS_INF from "0" as the default value to "1" or from "1" as the default value to "0." That is, the bitmap controller 230 may represent that a sub-block is a sub-block to be erased, by changing a bit value corresponding to the sub-block to be erased.

In an embodiment, after a sub-block which includes only invalid data in a victim block is erased, the victim block may become an open block. When the victim block becomes the open block, data may be programmed to the erased sub-block in the victim block. After the victim block becomes the open block, the bitmap controller 230 may output bitmap information BITMAP_INF to the memory device 100 in a program operation on the open block, which was previously the victim block. The memory device 100 may perform a program operation on pages included in the erased sub-block in the open block, based on the bitmap information BITMAP_INF.

Figure 3:
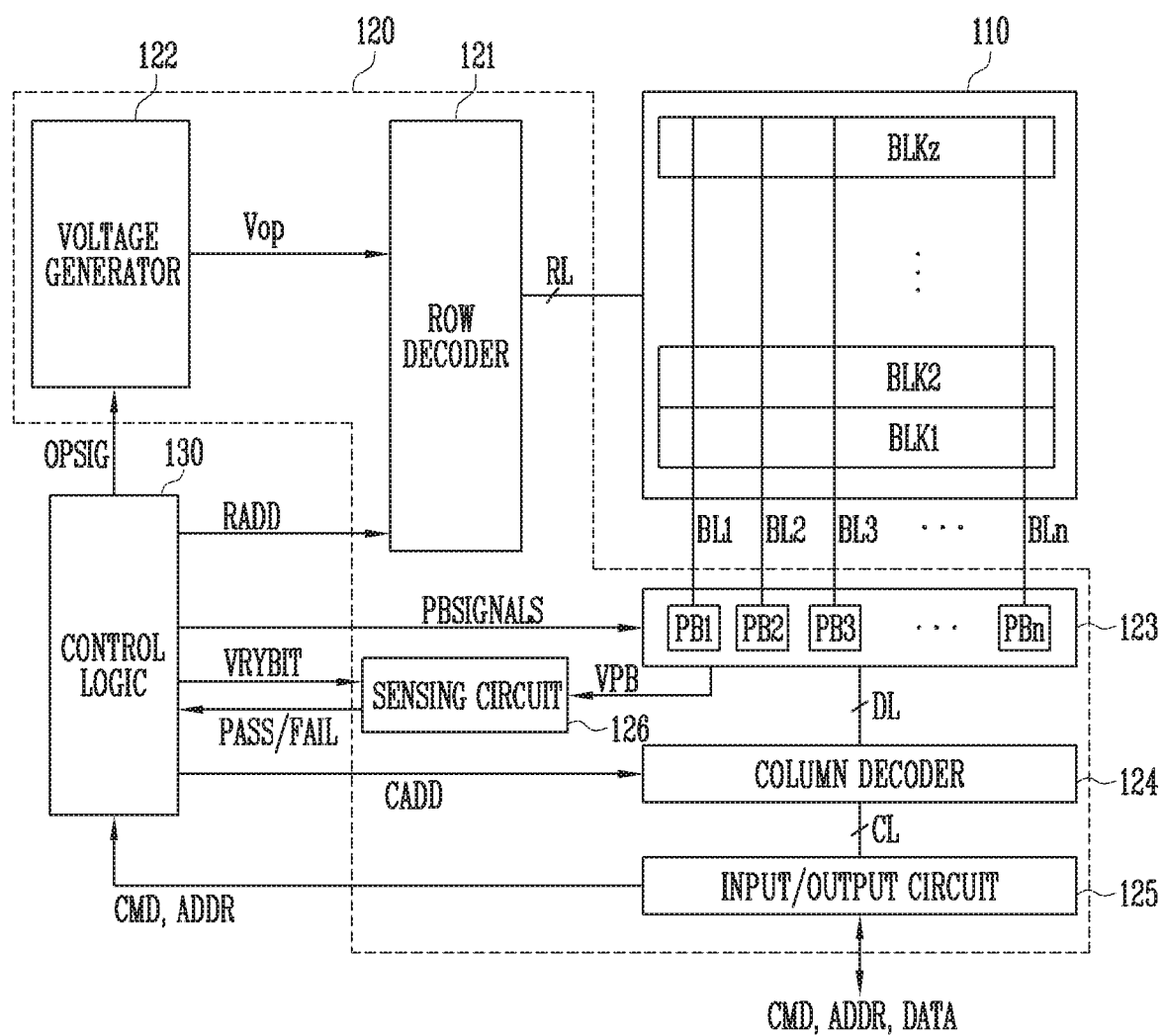
FIG. 3 is a diagram illustrating a structure of a memory device shown in FIG. 1.

FIG. 3 is a diagram illustrating a structure of the memory device shown in FIG. 1.

Referring to FIG. 3, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. The plurality of memory blocks BLK1 to BLKz are coupled to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as one page. Therefore, one memory block may include a plurality of pages.

The row lines RL may include at least one source select line, a plurality of word lines, and at least one drain select line.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and a sensing circuit 126.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 decodes row address RADD received from the control logic 130. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage having a level higher than that of the verify voltage to the unselected word lines.

In a read operation, the row decoder 121 may apply a read voltage to the selected word line, and apply a read pass voltage having a level higher than that of the read voltage to the unselected word lines.

In an embodiment, an erase operation of the memory device 100 is performed in a memory block unit. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. Specifically, the voltage generator may generate various operating voltages Vop used in program, read, and erase operations in response to an operation signal OPSIG. For example, the voltage generator 122 may generate a program voltage, a verify voltage, a pass voltage, a read voltage, an erased voltage, and the like under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage.

For example, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The page buffer group 123 includes first to nth page buffers PB1 to PBn. The first to nth page buffers PB1 to PBn are coupled to the memory cell array 110 respectively through first to nth bit lines BL1 to BLn. The first to nth bit lines BL1 to BLn operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense voltages or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page are programmed according to the transferred data DATA. In a program verify operation, the first to nth page buffers PB1 to PBn read page data by sensing voltages or currents received from the selected memory cells through the first to nth bit lines BL1 to BLn.

In a read operation, the first to nth page buffers PB1 to PBn read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn or apply an erase voltage.

The column decoder 124 may communicate data between the input/output circuit 125 and the page buffer group 123 in response to a column address CADD. For example, the column decoder 124 may communicate data with the first to nth page buffers PB1 to PBn through data lines EL, or communicate data with the input/output circuit 125 through column lines CL.

The input/output circuit 125 may transfer a command CMD and an address ADDR, which are received from the memory controller 200 described with reference to FIG. 1, to the control logic 130, or exchange data DATA with the column decoder 124.

In a read operation or verify operation, the sensing circuit 125 may generate a reference current in response to an allow bit VRYBIT signal, and output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. For example, the control logic 130 may control a read operation of a selected memory block in response to a sub-block read command and an address. Also, the control logic 130 may control an erase operation of a selected sub-block included in the selected memory block in accordance with a sub-block erase command and an address. Also, the control logic 130 may determine whether the verify operation has passed or failed in response to the pass or fail signal PASS/FAIL.

Each of the memory cells included in the memory cell array 110 may be programmed to any one program state among a plurality of program states according to data stored therein. A target program state of a memory cell may be determined to be any one of the plurality of program states according to data stored in the memory cell.

Figures 4, 5:
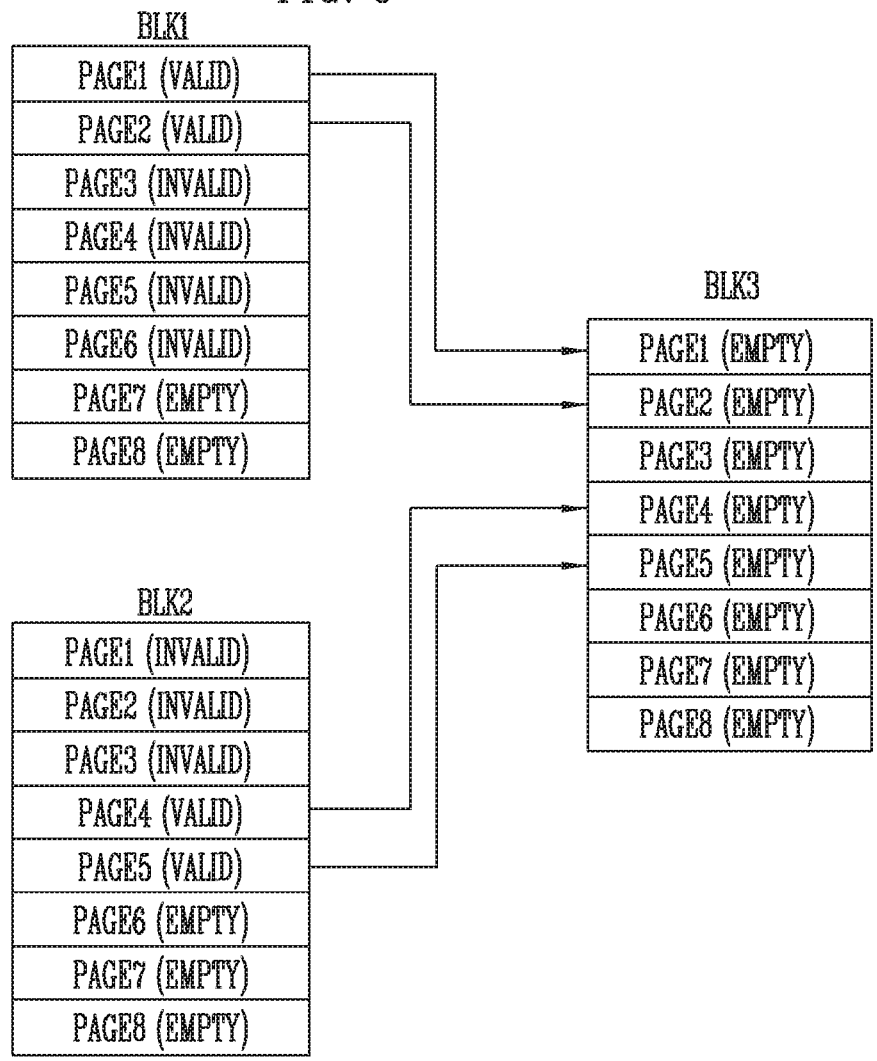
FIG. 4 is a diagram illustrating some of memory blocks shown in FIG. 3.
FIG. 5 is a diagram illustrating a conventional garbage collection operation.

FIG. 4 is a diagram illustrating some of the memory blocks shown in FIG. 3.

Referring to FIG. 4, FIG. 4 illustrates first to third memory blocks BLK1 to BLK3 as some of the memory blocks shown in FIG. 3. In FIG. 4, the first and second memory blocks BLK1 and BLK2 are memory blocks selected as victim blocks, and the third memory block BLK3 is a free block.

In an embodiment, the memory controller 200 may perform Garbage Collection (GC). The GC may be performed at an idle time at which the memory device 100 shown in FIG. 2 does not perform any operation. Further, the GC may be performed to secure a free block in which data is to be stored.

The first to third memory blocks BLK1 to BLK3 may be configured with a plurality of pages PAGE1 to PAGE8. The plurality pages may include a plurality of memory cells. Although a case where each memory block includes first to eighth pages PAGE1 to PAGE8, i.e., eight pages is illustrated in FIG. 4, a larger number of pages may be included in each memory block.

The first and second memory blocks BLK1 and BLK2 may be open blocks, and the third memory block BLK3 may be a free block. That is, data may be stored in the first and second memory blocks BLK1 and BLK2, and the third memory block BLK3 may be a memory block to be set as an open block.

In an embodiment, valid data VALID and invalid data INVALID may be stored in the first and second memory blocks BLK1 and BLK2. The third memory block BLK3 may have empty pages EMPTY in which any valid data VALID or invalid data INVALID is not stored.

Referring to FIG. 4, the first and second pages PAGE1 and PAGE2 of the first memory block BLK1 may be valid pages in which valid data VALID is stored, and the third to sixth pages PAGE3 to PAGE6 of the first memory block BLK1 may be invalid pages in which invalid data INVALID is stored. Invalid data INVALID may be stored in the third to sixth pages PAGE3 to PAGE6 of the first memory block BLK1. The invalid data INVALID may be data designated as data to be erased among valid data VALID.

The first to third pages PAGE1 to PAGE3 of the second memory block BLK2 may be invalid pages in which invalid data INVALID is stored, and the fourth and fifth pages PAGE4 and PAGE5 of the second memory block BLK2 may be valid pages in which valid data VALID is stored.

Since the first and second memory block BLK1 and BLK2 are open blocks in which data is stored, data may be stored in the seventh and eighth pages PAGE7 and PAGE8 of the first memory block BLK1 and the sixth to eighth pages PAGE6 to PAGE8 of the second memory block BLK2.

In an embodiment, the first and second memory blocks BLK1 and BLK2 may be selected as victim blocks. That is, since invalid and valid pages are included in the first and second memory blocks BLK1 and BLK2, the first and second memory blocks BLK1 and BLK2 may be selected as victim blocks. When the first and second memory blocks BLK1 and BLK2 are selected as the victim blocks, an operation for securing the first and second memory blocks BLK1 and BLK2 as free blocks may be performed.

Hereinafter, a conventional garbage collection operation will be described with reference to FIG. 5, and a garbage collection operation in the present disclosure will be described with reference to FIGS. 6 to 8.

FIG. 5 is a diagram illustrating a conventional garbage collection operation.

Referring to FIGS. 4 and 5, first to third memory blocks BLK1 to BLK3 shown in FIG. 5 may be the same memory blocks as the first to third memory blocks BLK1 to BLK3 shown in FIG. 4. FIG. 5 illustrates an operation after the first and second memory blocks BLK1 and BLK2 are selected as victim blocks, when the memory controller 200 shown in FIG. 2 performs Garbage Collection GC.

In an embodiment, in a GC operation, after data of valid pages in which valid data VALID is stored among pages included in the first and second memory blocks BLK1 and BLK2 as the victim blocks is copied to the third memory block BLK3 as a free block, the first and second memory blocks BLK1 and BLK2 may be erased. Therefore, when the GC is performed, a number of free blocks may increase.

For example, data of a first page PAGE1 as a valid page in the first memory block BLK1 may be copied to a first page PAGE1 of the third memory block BLK3, and data of a second page PAGE2 as another valid page in the first memory block BLK1 may be copied to a second page PAGE2 of the third memory block BLK3. In addition, data of a fourth page PAGE4 as a valid page in the second memory block BLK2 may be copied to a fourth page PAGE4 of the third memory block BLK3, and data of a fifth page PAGE5 as another valid page in the second memory block BLK2 may be copied to a fifth page PAGE5 of the third memory block BLK3.

When the data of the valid pages of the first and second memory blocks BLK1 and BLK2 as the victim blocks are copied to the third memory block BLK3 as the free block, the first and second memory blocks BLK1 and BLK2 may be erased. When the first and second memory blocks BLK1 and BLK2 as the victim blocks are erased, the first and second memory blocks BLK1 and BLK2 may become free blocks. When the first and second memory blocks BLK1 and BLK2 become free blocks, the first and second memory blocks BLK1 and BLK2 may be allocated as open blocks in which data is stored in a program operation to be subsequently performed.

As shown in FIG. 5, in the conventional GC, the memory controller 200 shown in FIG. 2 copies valid data VALID stored in a valid page of a memory block selected as a victim block to a free block and then erases the victim block. That is, a copy operation of moving valid data VALID stored in a valid page to a free block and a block erase operation of erasing the entire victim block are performed in the conventional GC, therefore, the power and time consumed in the GC may be increased.

However, in the GC in the present disclosure, which are shown in the drawings from FIG. 6, the copy operation of coping moving valid data VALID stored in a valid page to a free block is not performed, thus the power and time consumed in the GC can be decreased.

Hereinafter, GC of the present disclosure will be described.

FIG. 6 is a diagram illustrating a garbage collection operation according to an embodiment of the present disclosure.

Referring to FIGS. 4 and 6, first to third memory blocks BLK1 to BLK3 shown in FIG. 6 may be the same memory blocks as the first to third memory blocks BLK1 to BLK3 shown in FIG. 4. FIG. 6 illustrates an operation after the first and second memory blocks BLK1 and BLK2 are selected as victim blocks, when the memory controller 200 shown in FIG. 2 performs Garbage Collection GC. In the present disclosure, an operation, until a victim block is selected, may be the same as the conventional GC.

FIG. 6 illustrates a method for dividing a memory block selected as a victim block into sub-blocks and performing an erase operation on a sub-block.

In an embodiment, the victim block may be configured with a plurality of sub-blocks, and the sub-blocks may include at least one page. A number of pages included in each sub-block may be predetermined. In FIG. 6, the number of pages included in the sub-block is 2. However, in another embodiment, a larger number of pages may be included in the sub-block.

In an embodiment, (a) shown in FIG. 6 illustrates the first memory block BLK1 selected as a victim block.

In (a) shown in FIG. 6, the first memory block BLK1 may be configured with (1_1)th to (1_4)th sub-blocks SB1_1 to SB1_4. Each of the (1_1)th to (1_4)th sub-blocks SB1_1 to SB1_4 may include two pages. That is, the (1_1)th sub-block SB1_1 may include first and second pages PAGE1 and PAGE2, the (1_2)th sub-block SB1_2 may include third and fourth pages PAGE3 and PAGE4, the (1_3)th sub-block SB1_3 may include fifth and sixth pages PAGE5 and PAGE6, and the (1_4)th sub-block SB1_4 may include seventh and eighth pages PAGE7 and PAGE8.

In an embodiment, the (1_1)th sub-block SB1_1 may include only valid pages. That is, the first and second pages PAGE1 and PAGE2 included in the (1_1)th sub-block SB1_1 may be valid pages in which valid data VALID is stored. However, the third to sixth pages PAGE3 to PAGE6 included in the (1_2)th and (1_3)th sub-blocks SB1_2 and SB1_3 may be invalid pages storing invalid data INVALID. Further, the seventh and eighth pages PAGE7 and PAGE8 included in the (1_4)th sub-block SB1_4 may be empty pages EMPTY in which no data is stored.

Consequently, valid pages may be included in only the (1_1)th sub-block SB1_1 among the (1_1)th to (1_4)th sub-blocks SB1_1 to SB1_4 included in the first memory block BLK1 as the victim block.

In the present disclosure, the sub-block controller 220 shown in FIG. 2 in the memory controller 200 shown in FIG. 2 may check the (1_1)th sub-block SB1_1 in which only valid pages are included among the sub-blocks included in the first memory block BLK1, through sub-block information received from the memory device 100 shown in FIG. 2. That is, the sub-block controller may divide the first memory block BLK1 into the (1_1)th sub-block SB1_1 including only valid pages and the other blocks SB1_2 to SB1_4.

In the present disclosure, in a GC operation, when it is determined that a sub-block having only valid pages exists among sub-blocks included in a victim block, and any valid page is not included in the other sub-blocks, the sub-blocks except for the sub-block having only the valid pages, may be erased. That is, in the present disclosure, when GC is performed, the GC may be performed without moving valid data VALID included in a victim block to a free block and erasing only sub-blocks except for the sub-block having only the valid pages, without erasing the entire victim block.

Therefore, (a) shown in FIG. 6, when it is checked that only valid pages are included in the (1_1)th sub-block SB1_1 among the sub-blocks included in the first memory block BLK1, and any valid page is not included in the other sub-blocks, based on the sub-block information received from the memory device, the (1_1)th sub-block SB1_1 cannot become a block to be erased, and only the (1_2)th and (1_3)th sub-blocks SB1_2 and SB1_3 may be erased (SB_ERASE). Since the (1_4)th sub-block SB1_4 has only empty pages, the (1_4)th sub-block SB1_4 cannot be a block to be erased.

When the (1_1)th sub-block SB1_1 and the (1_2)th and (1_3)th sub-blocks SB1_2 and SB1_3 except for the (1_4)th sub-block SB1_4 having only empty pages are erased, the third to sixth pages PAGE3 to PAGE6 included in the (1_2)th and (1_3)th sub-blocks SB1_2 and SB1_3 may become empty pages EMPTY.

In an embodiment, (b) shown in FIG. 6 illustrates the second memory block BLK2 selected as a victim block.

In (b) shown in FIG. 6, the second memory block BLK2 may be configured with (2_1)th to (2_4)th sub-blocks SB2_1 to SB2_4. Each of the (2_1)th to (2_4)th sub-blocks SB2_1 to SB2_4 may include two pages. That is, the (2_1)th sub-block SB2_1 may include first and second pages PAGE1 and PAGE2, the (2_2)th sub-block SB2_2 may include third and fourth pages PAGE3 and PAGE4, the (2_3)th sub-block SB2_3 may include fifth and sixth pages PAGE5 and PAGE6, and the (2_4)th sub-block SB2_4 may include seventh and eighth pages PAGE7 and PAGE8.

In an embodiment, any sub-block including only valid pages in which valid data VALID is stored may not exist among the (2_1)th to (2_4)th sub-blocks SB2_1 to SB2_4. That is, since the (2_2)th sub-block SB2_2 includes the fourth page PAGE4 as a valid page, but also includes the third page PAGE3 as an invalid page, the (2_2)th sub-block SB2_2 is not a sub-block having only valid pages. Similarly, since the (2_3)th sub-block SB2_3 includes the fifth page PAGE5 as a valid page, but also includes the sixth page PAGE6 as an empty page, the (2_3)th sub-block SB2_3 is not a sub-block having only valid pages.

Consequently, the second memory block BLK2 does not include any sub-block having only valid pages, and therefore, an erase operation by units of sub-blocks may be not performed in the second memory block BLK2. In other words, because a sub-block having only valid pages in the second memory block BLK2 does not exist, an erase operation by units of sub-blocks may be not performed in the second memory block BLK2.

FIG. 7 illustrates a bitmap in an erase operation on a sub-block in a victim block.

Referring to FIGS. 6 and 7, FIG. 7 illustrates a bitmap included in the bitmap controller 230 shown in FIG. 2. The bitmap controller may include a bitmap for each memory block. In FIG. 7, a bitmap of the first memory block BLK1 among a plurality of bitmaps is illustrated.

When a bitmap of each memory block is initially generated, the bitmap may generate bit values in units of sub-blocks included in the memory block. When the bitmap is generated, a bit value corresponding to each sub-block may be "0" as a default value. In this drawing, the default value is "O". Alternatively, the default value may be set to "1" in some memory devices.

In an embodiment, the first memory block BLK1 may be configured with (1_1)th (1_4)th sub-blocks SB1_1 to SB1_4. When a bitmap of the first memory block BLK1 is generated, a bit value corresponding to each of the (1_1)th (1_4)th sub-blocks SB1_1 to SB1_4 may be "0" as the default value.

In an embodiment, the bitmap controller 230 may change a bit value included in the bitmap, based on sub-block erase information received from the sub-block controller 220 shown in FIG. 2.

Specifically, only the (1_1) sub-block SB1_1 among the sub-blocks included in the first memory block BLK1 as a victim block has valid pages, and any valid page is not included in the other sub-blocks SB1_2 to SB1_4. Hence, the sub-block controller 220 may determine that the (1_2)th and (1_3)th sub-blocks SB1_2 and SB1_3 are to be erased. Therefore, the sub-block controller may generate sub-block erase information representing that the (1_2)th and (1_3)th sub-blocks SB1_2 and SB1_3 are to be erased, and output the generated sub-block erase information to the bitmap controller.

The bitmap controller 230 shown in FIG. 2 may change a bit value corresponding to the sub-block by receiving the sub-block erase information. That is, the bitmap controller may change a bit value corresponding to each of the (1_2)th and (1_3)th sub-blocks SB1_2 and SB1_3 from "0" as the default value to "1."

Additionally, the bitmap controller may change a bit value corresponding to the (1_4)th sub-block SB1_4 including only empty pages from "0" as the default value to "1." The bit value corresponding to the (1_4)th sub-block SB1_4 including only empty pages may also be changed to represent that the (1_4)th sub-block SB1_4 is a sub-block to which data can be programmed through the bitmap.

Consequently, the bit values corresponding to the (1_2)th and (1_3)th sub-blocks SB1_2 and SB1_3 as sub-blocks on which an erase operation is performed and the bit value corresponding to the (1_4)th sub-block SB1_4 including only empty pages may be changed from the default value to a specific value.

After, the sub-blocks are erased, the first memory block BLK1 may be set as an open block. When the first memory block BLK1 is set as the open block, new data may be stored in the first memory block BLK1.

When the new data is programmed to the first memory block BLK1, the bitmap controller may output the bitmap of the first memory block BLK1 to the memory device 100 shown in FIG. 2. That is, the bitmap controller may output information on sub-blocks including programmable pages in the first memory block BLK1, and the memory device may check the programmable pages and then perform a program operation.

Figures 8, 9:
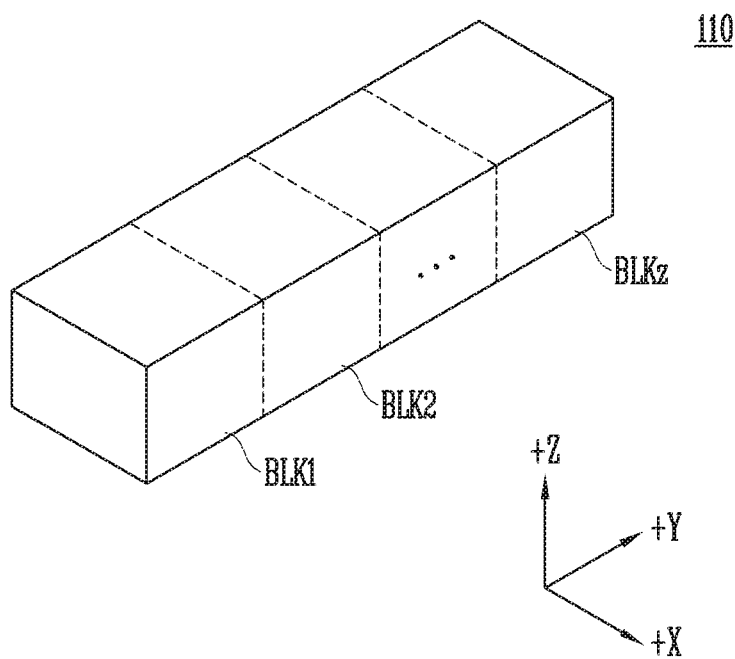
FIG. 8 illustrates a victim block being selected as an open block after an erase operation on a sub-block in the victim block.
FIG. 9 is a diagram illustrating an embodiment of a memory cell array shown in FIG. 3.

FIG. 8 illustrates a case where a victim block is set as an open block after an erased operation on a sub-block in the victim block.

Referring to FIGS. 6 and 8, FIG. 8 illustrates a case where a program operation is performed on the (1_2)th sub-block SB1_2, after the (1_2)th and (1_3)th sub-blocks SB1_2 and SB1_3 included in the first memory block BLK1 as a victim block are erased.

Specifically, after the (1_2)th and (1_3)th sub-blocks SB1_2 and SB1_3 included in the first memory block BLK1 are erased, the first memory block BLK1 may be selected as an open block. When the first memory block BLK1 is selected as the open block, new data may be stored in the first memory block BLK1. When the new data is stored in the first memory block BLK1, the new data may be stored based on bitmap information received from the bitmap controller 230 shown in FIG. 2.

In an embodiment, after an erase operation is performed on the (1_2)th and (1_3)th sub-blocks SB1_2 and SB1_3, the (1_2)th and (1_3)th sub-blocks SB1_2 and SB1_3 may have only empty pages EMPTY. Therefore, when the first memory block BLK1 is set as the open block, data may be stored in the (1_2)th and (1_3)th sub-blocks SB1_2 and SB1_3 having only empty pages.

For example, after the first memory block BLK1 is selected as the open block, the memory device may receive a program command instructing a program operation to be performed on pages included in the first memory block BLK1 from the memory controller 200 shown in FIG. 2. When the memory device receives the program command from the memory controller, the memory device may also receive bitmap information from the bitmap controller.

Subsequently, the memory device may check that the (1_2)th to (1_4)th sub-blocks SB1_2 to SB1_4 have only empty pages, based on the bitmap information, and perform a program operation on pages included in the (1_2)th to (1_4)th sub-blocks SB1_2 to SB1_4. For example, a program operation may be performed on the third and fourth pages PAGE3 and PAGE4 included in the (1_2)th sub-block SB1_2.

Therefore, valid data VALID may be stored in the first and second pages PAGE1 and PAGE2 of the (1_1)th sub-block SB1_1 and the third and fourth pages PAGE3 and PAGE4 of the (1_2)th sub-block SB1_2 in the first memory block BLK1, and the third and fourth pages PAGE3 and PAGE4 may become valid pages in which valid data VALID data is stored.

FIG. 9 is a diagram illustrating an embodiment of the memory cell array shown in FIG. 3.

Referring to FIG. 9, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIGS. 10 and 11.

Figure 10:
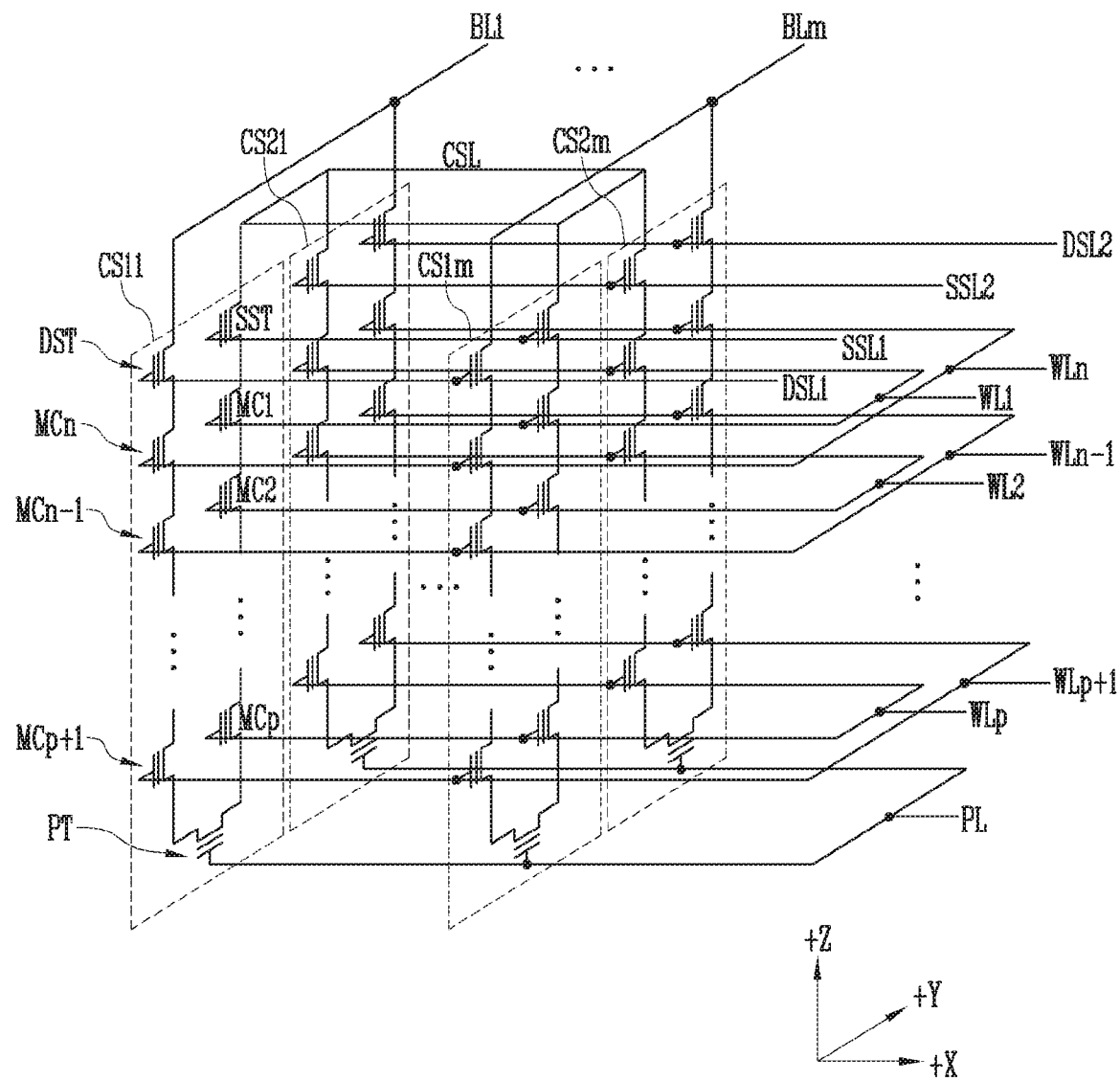
FIG. 10 is a circuit diagram illustrating any one memory block among memory blocks shown in FIG. 9.

FIG. 10 is a circuit diagram illustrating any one memory block BLKa among the memory blocks BLK1 to BLKz shown in FIG. 9.

Referring to FIG. 10, the memory block BLKa may include a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (i.e., a +X direction). FIG. 10 illustrates two cell strings arranged in a column direction (i.e., a +Y direction). However, this is for convenience of description, and it will be understood that three cell strings may be arranged in the column direction.

Each of the plurality of cell strings CS11 to CS1$m$ and CS21 to CS2$m$ may include at least one source select transistor SST, first to nth memory cells MC1 to MCn, a pipe transistor PT, and at least one drain select transistor DST.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 10, the source select transistors of the cell strings CS11 to CS1$m$ on a first row are coupled to a first source select line SSL1. The source select transistors of the cell strings CS21 to CS2m on a second row are coupled to a second source select line SSL2.

In another embodiment, the source select transistors of the cell strings CS11 to CS1m and CS21 to CS2m may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1m on the first row are coupled to a first drain select line DSL1. The drain select transistors of the cell strings CS21 to CS2m on the second row are coupled to a second drain select line DSL2.

Cell strings arranged in the column direction are coupled to a bit line extending in the column direction. In FIG. 10, the cell strings CS11 and CS21 on a first column are coupled to a first bit line BL1. The cell strings CS1m and CS2m on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn.

When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the at least one dummy memory cell, the dummy memory cells may have a required threshold voltage. Before or after an erase operation of the memory block BLKa, a program operation may be performed on all or some of the dummy memory cells. When an erase operation is performed after the program operation is performed, the threshold voltage of the dummy memory cells controls a voltage applied to the dummy word lines coupled to the respective dummy memory cells, so that the dummy memory cells can have the required threshold voltage.

Figure 11:
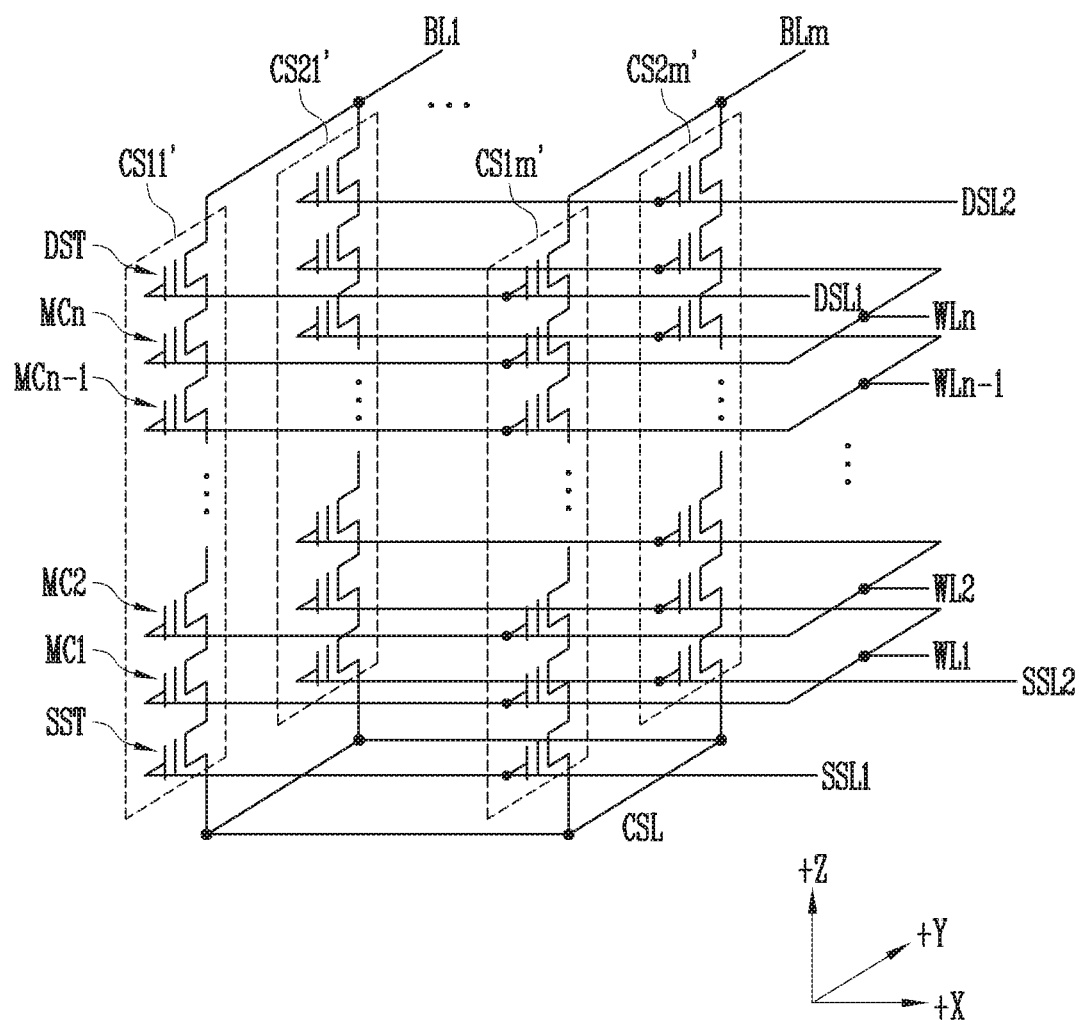
FIG. 11 is a circuit diagram illustrating another embodiment of the one memory block among the memory blocks shown in FIG. 9.

FIG. 11 is a circuit diagram illustrating another embodiment BLKb of the one memory block among the memory blocks BLK1 to BLKz shown in FIG. 9.

Referring to FIG. 11, the memory block BLKb may include a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Consequently, the memory block BLKb of FIG. 11 has a circuit similar to that of the memory block BLKa of FIG. 10, except that the pipe transistor PT is excluded from each cell string in FIG. 11.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In addition, at least one of the first to nth memory cells MC1 to MCn may be used as a dummy memory cell to decrease an electric field between the source select transistor SST and the memory cells MC1 to MCn.

Figure 12:
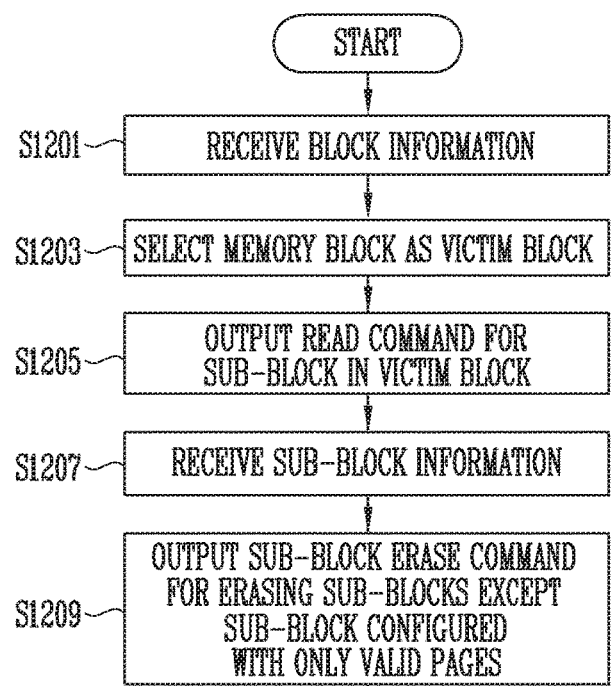
FIG. 12 is a diagram illustrating an operation of the memory controller in accordance with an embodiment of the present disclosure.

FIG. 12 is a diagram illustrating an operation of the memory controller in accordance with an embodiment of the present disclosure.

Referring to FIG. 12, in step S1201, the memory controller may receive memory block information from the memory device, when the memory controller performs Garbage Collection (GC). The memory block information may include information on whether valid pages in which valid data is stored and invalid pages in which invalid data is stored are included in each of the plurality of memory blocks included in the memory device.

When the memory controller receives the memory block information from the memory device, the memory controller may select a memory block as a victim block (S1203). For example, a memory block including both valid and invalid pages among the plurality of memory blocks may be set as a victim block. The number of memory blocks set as victim blocks may vary. Also, the number of memory blocks set as victim blocks may be determined according to the performance of the memory device.

When at least one victim block is selected, the memory controller may output a read command for a sub-block in the victim block to the memory device (S1205). The victim block may be configured with a plurality of sub-blocks, and each of the sub-blocks may include at least one page.

In an embodiment, the memory controller may output a read command for checking whether a page included in a sub-block in the victim block is a valid page or invalid page. The memory controller may receive sub-block information corresponding to the read command (S1207). The sub-block information may include information on the valid page or invalid page included in the sub-block in the victim block.

After the memory controller receives the sub-block information, in step S1209, the memory controller may output a sub-block erase command for erasing the other sub-blocks except for the sub-block having the valid page.

In an embodiment, the memory controller may determine a sub-block having only valid pages among the sub-blocks included in the victim block, based on the sub-block information. When it is checked that the sub-block having only valid pages exists, and any valid page does not exist in the other sub-blocks, the memory controller may output a command for erasing sub-blocks except for the sub-block having only valid pages in a corresponding victim block. Any erase operation may not be performed on a sub-block having only empty pages.

In the present disclosure, when the GC is performed, data of a valid page in a victim block is not moved to a free block, and a sub-block instead of the entire victim block is erased. Hence, the GC can be efficiently performed.

Figure 13:
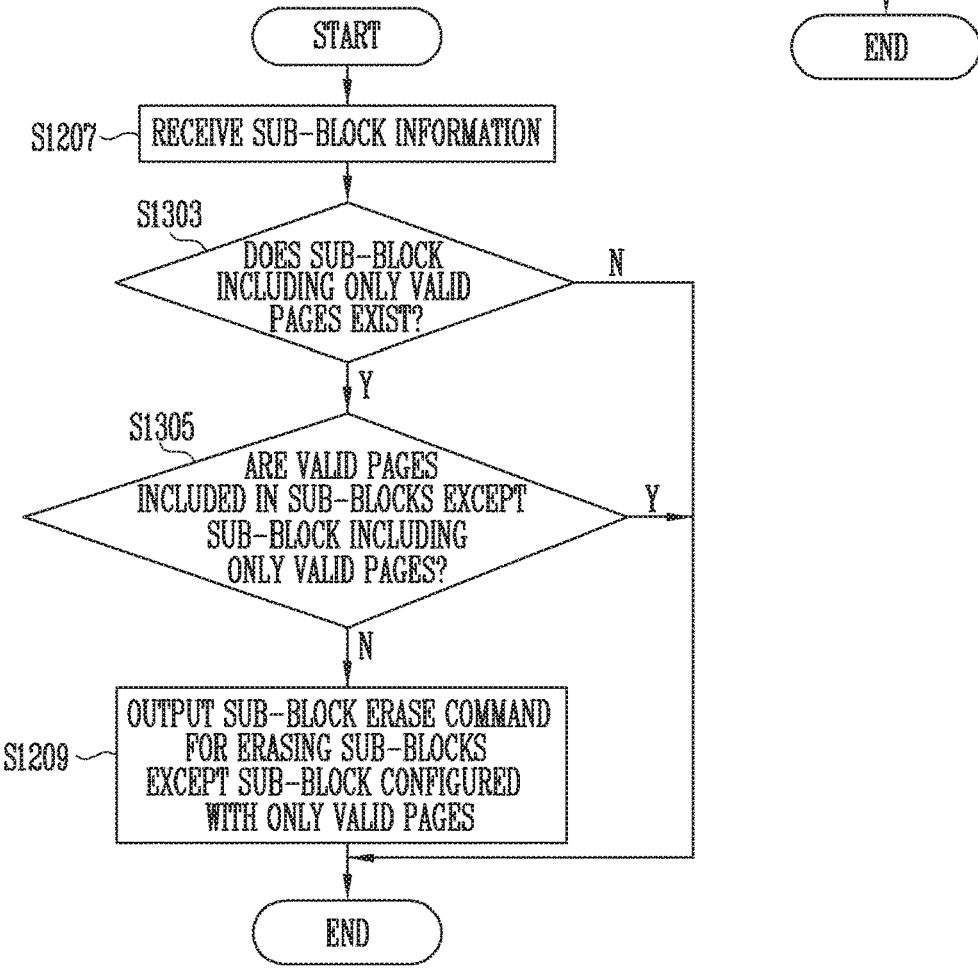
FIG. 13 is a diagram illustrating an operation of the memory controller in accordance with an embodiment of the present disclosure.

FIG. 13 is a diagram illustrating an operation of the memory controller in accordance with an embodiment of the present disclosure.

Referring to FIGS. 12 and 13, FIG. 13 illustrates an operation performed between the steps S1207 and S1209 shown in FIG. 12. Specifically, an operation of determining a sub-block to be erased among the sub-blocks in the victim block may be performed between the steps S1207 and S1209.

In the step S1207, when the memory controller performs Garbage Collection (GC), the memory controller may receive sub-block information from the memory device. The sub-block information may include information on a valid page or invalid page included in a sub-block in the victim block.

The memory controller may determine whether a sub-block including only valid pages exists, based on the received sub-block information (S1303). For example, when a first memory block is set as the victim block, the memory controller may determine whether a sub-block including only valid pages exists among sub-blocks included in the first memory block.

In an embodiment, when a sub-block including only valid pages exists among the sub-blocks included in the victim block (S1303: Y), the memory controller may determine whether valid pages are included in sub-blocks except for the sub-block including only the valid pages, among the sub-blocks included in the victim block (S1305). The other way, when a sub-block including only valid pages does not exist among the sub-blocks included in the victim block (S1303: N), because a sub-block having only valid pages in the second memory block BLK2 does not exist, an erase operation by units of sub-blocks may be not performed.

When any valid page is not included in the sub-blocks except for the sub-block including only the valid pages among the sub-blocks included in the victim block (S1305: N), the memory controller may output a sub-block erase command for erasing the other sub-blocks except for the sub-block including only the valid pages (S1209). The memory device may erase the sub-blocks except for the sub-block including only the valid pages, corresponding to the sub-block erase command.

Figure 14:
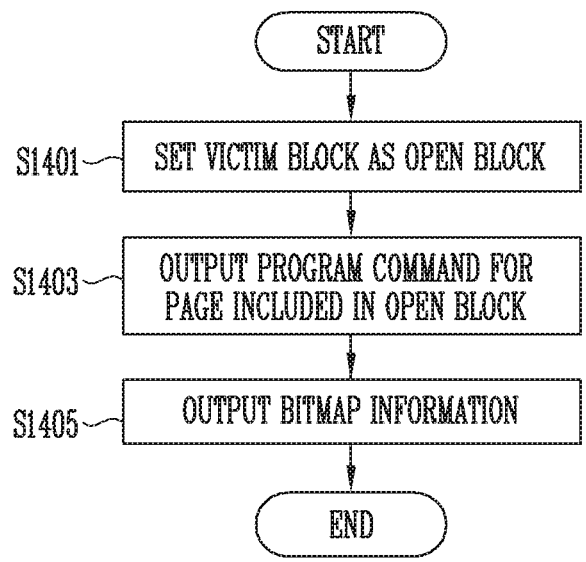
FIG. 14 is a diagram illustrating an operation of the memory controller in accordance with an embodiment of the present disclosure.

FIG. 14 is a diagram illustrating an operation of the memory controller in accordance with an embodiment of the present disclosure.

Referring to FIG. 14, FIG. 14 illustrates steps after sub-blocks in a victim block are erased by the GC of the present disclosure.

In step S1401, the memory controller may set a victim block as an open block. That is, since sub-blocks except for a sub-block including only valid pages in a victim block are erased, the corresponding victim block may be set as an open block for storing data.

When the victim block is set as the open block, the memory controller may output a program command for a page included in the open block (S1403).

In an embodiment, the memory controller may control data to be programmed to an erased sub-block or a sub-block having only empty pages among sub-blocks included in the open block. Therefore, the memory controller may output bitmap information when the memory controller outputs the program command (S1405).

In an embodiment, a bit value may be set for each sub-block included in a memory block. A bit value corresponding to a sub-block may be changed after the sub-block is erased, or be changed when the sub-block has only empty pages. Therefore, the memory device may check the empty page included in the sub-block and then program data to the empty page, based on the bitmap information including information on the changed bit value.

Figure 15:
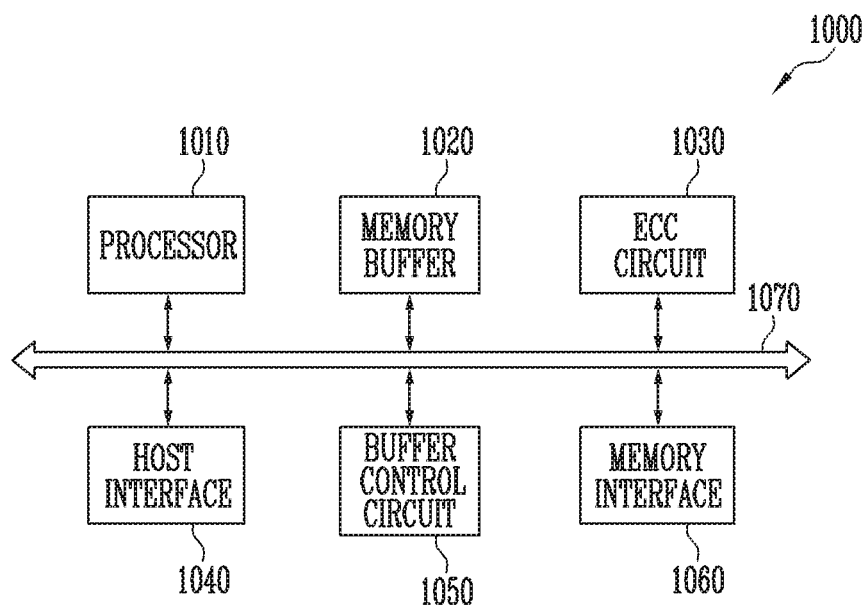
FIG. 15 is a diagram illustrating another embodiment of the memory controller shown in FIG. 1.

FIG. 15 is a diagram illustrating another embodiment of the memory controller shown in FIG. 1.

Referring to FIG. 15, a memory controller 1000 is coupled to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

When the memory controller 200 shown in FIG. 2 performs Garbage Collection GC, the processor 1010 may perform the GC without moving, to a free block, valid data of a memory block selected as a victim block among the memory blocks included in the memory device. In an embodiment, the processor 1010 may divide the victim block by units of sub-blocks, and erase the other sub-blocks except a sub-bock including only valid pages, when only the valid page is included in the sub-block. Therefore, any valid page should not exist in the other sub-blocks except for the sub-block including only the valid pages.

Subsequently, when the memory block selected as the victim block is selected as an open block, data may be stored in an erased sub-block among sub-blocks of the memory block selected as the open block or a sub-block including only empty pages among unerased sub-blocks.

The processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 16:
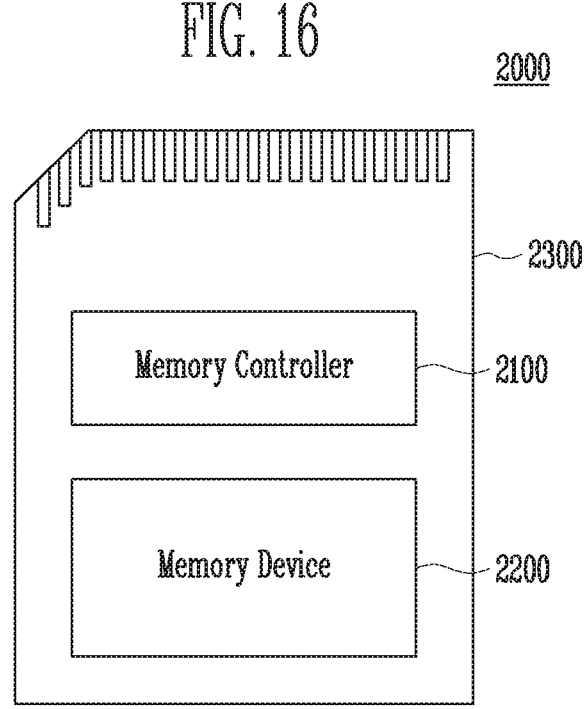
FIG. 16 is a block diagram illustrating a memory card system to which the storage device is applied in accordance with an embodiment of the present disclosure.

FIG. 16 is a block diagram illustrating a memory card system to which the storage device is applied in accordance with an embodiment of the present disclosure.

Referring to FIG. 16, the memory card system 2000 includes a memory controller 2100, a memory device, and a connector 2300.

The memory controller 2100 is coupled to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory device 2200 may be implemented identically to the memory device 100 described with reference to FIG. 3.

When the memory controller 2100 performs Garbage Collection GC, the memory controller 2100 may perform the GC without moving, to a free block, valid data of a memory block selected as a victim block among the memory blocks included in the memory device 2200. In an embodiment, the memory controller 2100 may divide the victim block by units of sub-blocks, and erase the other sub-blocks except a sub-bock including only valid pages, when only the valid page is included in the sub-block. Therefore, any valid page should not exist in the other sub-blocks except for the sub-block including only the valid pages.

Subsequently, when the memory block selected as the victim block is selected as an open block, data may be stored in an erased sub-block among sub-blocks of the memory block selected as the open block or a sub-block including only empty pages among unerased sub-blocks.

In an example, the memory controller 2100 may include components such as a Random Access Memory (RAM), a processing unit, a host interface, a memory interface, and an ECC circuit.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

In an embodiment, the memory device 2200 may determine whether ROM data stored in prediction blocks respectively included in a plurality of planes are the same or whether ROM data stored in prediction blocks respectively included in a plurality of planes and ROM data stored in a ROM in the memory device 2200 may be the same. When the ROM data are not all the same, the memory device 2200 may determine a majority of ROM data, and perform an operation for correcting an error occurring in a minority of ROM data or replacing the minority of ROM data with the majority of ROM data.

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 17:
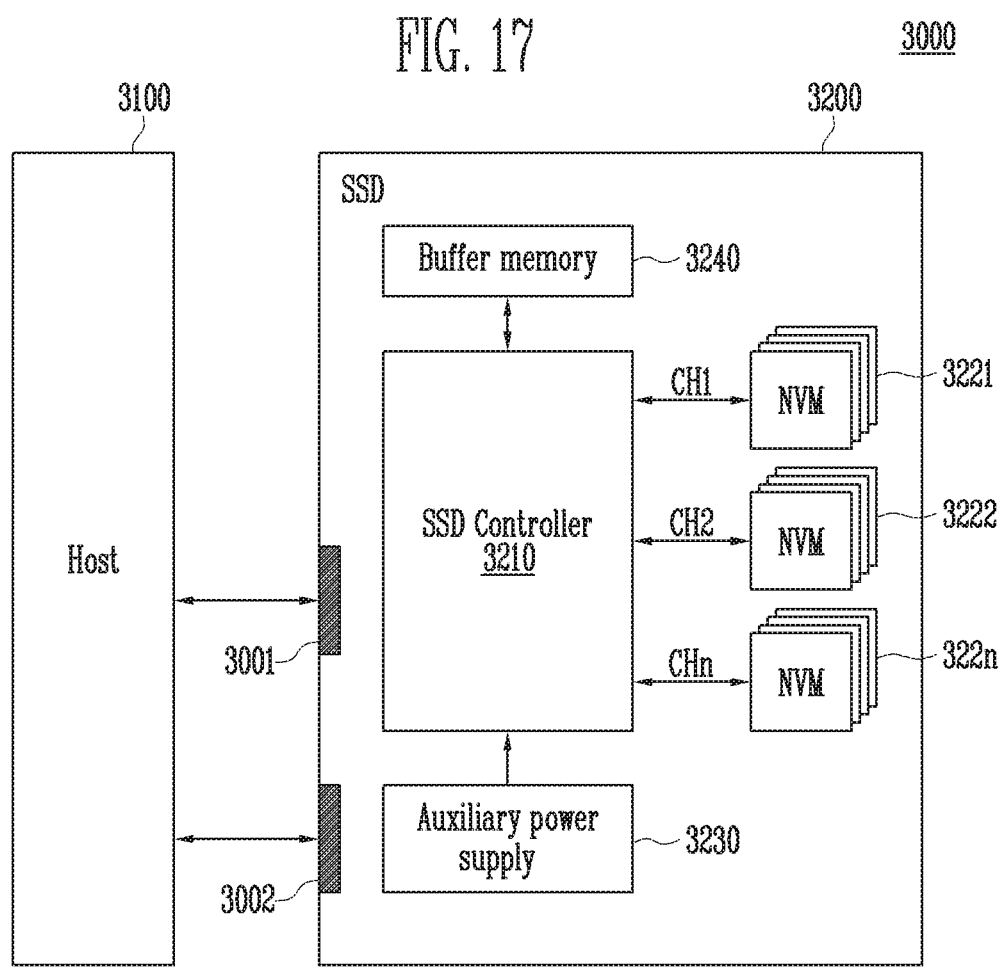
FIG. 17 is a block diagram exemplarily illustrating a Solid State Drive (SSD) system to which the storage device is applied in accordance with an embodiment of the present disclosure.

FIG. 17 is a block diagram exemplarily illustrating a Solid State Drive (SSD) system to which the storage device is applied in accordance with an embodiment of the present disclosure.

Referring to FIG. 17, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

When the SSD controller 3210 performs Garbage Collection GC, the SSD controller 3210 may perform the GC without moving, to a free block, valid data of a memory block selected as a victim block among the memory blocks included in the plurality of flash memories 3221 to 322n. In an embodiment, the SSD controller 3210 may divide the victim block by units of sub-blocks, and erase the other sub-blocks except for a sub-bock including only valid pages, when only the valid page is included in the sub-block. Therefore, any valid page should not exist in the other sub-blocks except for the sub-block including only the valid pages.

Subsequently, when the memory block selected as the victim block is selected as an open block, data may be stored in an erased sub-block among sub-blocks of the memory block selected as the open block or a sub-block including only empty pages among unerased sub-blocks.

The auxiliary power supply 3230 is coupled to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 18:
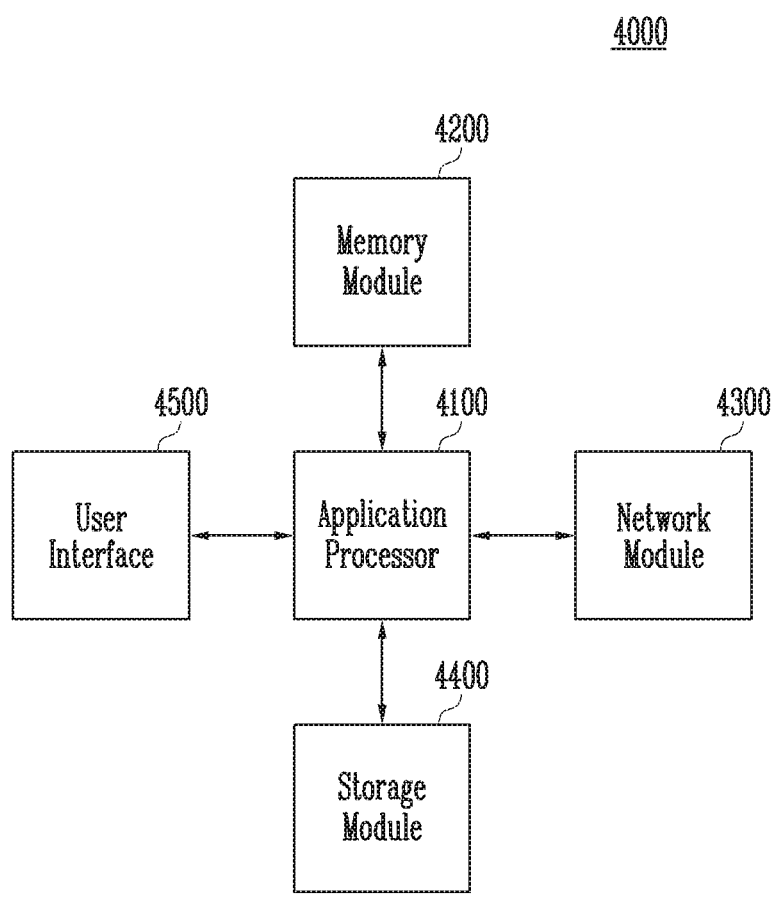
FIG. 18 is a block diagram illustrating a user system to which the storage device is applied in accordance with an embodiment of the present disclosure.

FIG. 18 is a block diagram illustrating a user system to which the storage device is applied in accordance with an embodiment of the present disclosure.

Referring to FIG. 18, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

When the application processor 4100 performs Garbage Collection GC, the application processor 4100 may perform the GC without moving, to a free block, valid data of a memory block selected as a victim block among the memory blocks included in the storage module 4400. In an embodiment, the application processor 4100 may divide the victim block by units of sub-blocks, and erase the other sub-blocks except a sub-bock including only valid pages, when only the valid page is included in the sub-block. Therefore, any valid page should not exist in the other sub-blocks except for the sub-block including only the valid pages.

Subsequently, when the memory block selected as the victim block is selected as an open block, data may be stored in an erased sub-block among sub-blocks of the memory block selected as the open block or a sub-block including only empty pages among unerased sub-blocks.

The memory module 4200 may operate as a main memory, working memory, buffer memory, or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIGS. 3 and 9 to 11. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, when garbage collection is performed, a victim block is not entirely erased but is erased by units of sub-blocks, without moving valid data of the victim block to a free block, so that the garbage collection can be efficiently performed.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory controller for controlling a memory device including a plurality of memory blocks in which data is stored, the memory controller comprising:
   a victim block setting circuit configured to:
      receive memory block information on numbers of valid pages and invalid pages, which are included in each of the plurality of memory blocks, and
      select a victim block among the memory blocks based on the memory block information, when garbage collection is performed; and
   a sub-block controller configured to:
      divide the victim block into sub-blocks including a plurality of pages,
      output a sub-block read command for determining valid pages in which valid data is stored among the plurality of pages,
      receive sub-block information representing the valid pages included in each of the sub-blocks, among the plurality of pages, corresponding to the sub-block read command from the memory device,
      determine target sub-blocks including only invalid pages among the sub-blocks based on the sub-block information, and
      output a sub-block erase command for selectively erasing a part of the victim block, to the target sub-blocks.

2. The memory controller of claim 1, wherein the sub-block information represents whether only invalid pages are included in each of the sub-blocks within the victim block.

3. The memory controller of claim 2, wherein the sub-block controller determines whether a sub-block including at least one valid page and at least one invalid page exists among the sub-blocks.

4. The memory controller of claim 3, wherein the sub-block controller suspends an operation for erasing the sub-blocks in response to existence of the sub-block including at least one valid page and at least one invalid page.

5. The memory controller of claim 1, wherein, when the sub-block erase command is output, the sub-block controller generates sub-block erase information indicating the sub-block to be erased corresponding to the sub-block erase command.

6. The memory controller of claim 5, further comprising a bitmap controller configured to include a bit map for each of the plurality of memory blocks and control a bit value included in the bit map,
wherein the bit value included in the bitmap is determined for each of the sub-blocks.

7. The memory controller of claim 6, wherein the bitmap controller changes a bit value corresponding to the sub-block to be erased and a bit value corresponding to a sub-block having only empty pages among bit values included in the bitmap corresponding to the victim block.

8. The memory controller of claim 7, wherein, when the victim block becomes an open block after the sub-block included in the victim block is erased, a page in which new data received from a host is to be stored is determined based on the bitmap of the victim block.

9. The memory controller of claim 8, wherein any one of pages included in a sub-block corresponding to the changed bit value among the bit values included in the bitmap of the victim block is determined as the page in which the new data received from the host is to be stored.

10. A method for operating a memory controller for controlling a memory device including a plurality of memory blocks in which data is stored, the method comprising:
receiving memory block information on numbers of valid pages and invalid pages, which are included in each of the plurality of memory blocks, when garbage collection is performed;
selecting a victim block among the memory blocks, based on the memory block information;
dividing the victim block into sub-blocks including a plurality of pages;
outputting a sub-block read command for determining valid pages in which valid data is stored among the plurality of pages;
receiving sub-block information representing the valid pages included in each of the sub-blocks, among the plurality of pages, corresponding to the sub-block read command from the memory device;
determining a sub-block including only invalid pages among the sub-blocks within the victim block based on the sub-block information; and
outputting a sub-block erase command for erasing the determined sub-block.

11. The method of claim 10, wherein the determining of the sub-block including only invalid pages is performed by receiving the sub-block information representing whether only invalid pages are included in each of the sub-blocks within the victim block.

12. The method of claim 11, wherein the determining of the sub-block including only invalid pages includes determining whether a sub-block including at least one valid page and at least one invalid page exists among the sub-blocks.

13. The method of claim 12, further comprising suspending an operation for erasing the determined sub-block in response to existence of the sub-block including at least one valid page and at least one invalid page.

14. The method of claim 10, further comprising changing a bit value included in a bitmap of the victim block, based on sub-block erase information,
wherein the bit value is set for each of the sub-blocks included in the victim block.

15. The method of claim 14, wherein a bit value corresponding to the sub-block to be erased and a bit value corresponding to a sub-block having only empty pages among the bit values included in a bitmap corresponding to the victim block are changed.

16. The method of claim 15, further comprising determining a page in which new data is to be stored, based on the bitmap of the victim block, when the victim block becomes an open block after the sub-block included in the victim block is erased.

17. The method of claim 16, wherein any one of pages included in a sub-block corresponding to the changed bit value among the bit values included in the bitmap of the victim block is determined as the page in which the new data is to be stored.

18. A memory system comprising:
a memory device including a victim memory block having plural sub-blocks each having plural pages; and
a controller configured to:
control, during a garbage collection operation on the victim memory block, the memory device to select a sub-block having only invalid pages among the plural sub-blocks and erase the sub-block for selectively erasing a part of the victim memory block;
receive memory block information on numbers of valid pages and invalid pages, which are included in each of the plural sub-blocks from the memory device;
control the memory device to select a sub-block based on the memory block information, when garbage collection is performed;
control the memory device to output a sub-block read command for determining valid pages in which valid data is stored among the plural pages in a sub-block of the plural sub-blocks;
receive sub-block information representing the valid pages included in each of the plural sub-blocks, corresponding to the sub-block read command from the memory device;
determine target sub-blocks including only invalid pages among the sub-blocks within the victim block based on the sub-block information;
output a sub-block erase command for selectively erasing a part of the victim block, to the target sub-blocks; and
set the victim memory block as an open memory block without moving valid data from the victim memory block to any memory block.

* * * * *